United States Patent [19]

Jones

[11] Patent Number: 4,605,072

[45] Date of Patent: Aug. 12, 1986

[54] SOIL CULTIVATING APPARATUS

[75] Inventor: Fred A. Jones, Redhouse Farm, Spalford Lane, North Scarle, Lincoln, England

[73] Assignees: Fred A. Jones; Jean Jones, both of North Scarle, England

[21] Appl. No.: 486,194

[22] Filed: Apr. 18, 1983

[30] Foreign Application Priority Data

Apr. 20, 1982 [GB] United Kingdom ............... 8211396

[51] Int. Cl.⁴ .............................................. A01B 61/00
[52] U.S. Cl. .................................. 172/236; 172/269; 172/260.5
[58] Field of Search .............. 172/269, 270, 271, 236, 172/237, 699, 260.5

[56] References Cited

U.S. PATENT DOCUMENTS

| 451,256 | 4/1891 | Barton | 172/269 |
| 1,854,904 | 4/1932 | Johnson | 172/269 X |
| 2,100,856 | 11/1937 | Killefer | 172/237 |
| 2,788,731 | 4/1957 | Lindgren | 172/269 X |

FOREIGN PATENT DOCUMENTS

| 1026565 | 3/1958 | Fed. Rep. of Germany | 172/236 |
| 336265 | 2/1936 | Italy | 172/236 |
| 342777 | 1/1960 | Switzerland | 172/269 |
| 1697630 | 9/1953 | United Kingdom | 172/269 |

Primary Examiner—Richard J. Johnson
Attorney, Agent, or Firm—William R. Hinds

[57] ABSTRACT

Soil cultivating apparatus is provided including a cultivating tool for entering into the soil, and control means responsive to the force exerted on said tool by an obstacle encountered by said tool as the tool is drawn through the soil to lift the tool out of the soil. In a preferred embodiment a spring biased latch holds a control arm hinged to a secondary member itself hinged to the main frame of the apparatus, and the soil-cultivating tool extends from the control arm. A ground engaging pad on the control arm levers the tool out of the ground when the tool is released by the latch in response to an excessive force thereon due to the obstacle.

4 Claims, 3 Drawing Figures

TO HYDRAULIC SYSTEM
WITH ADJUSTABLE UNLOADER VALVE

SOIL CULTIVATING APPARATUS

BACKGROUND OF THE INVENTION

This invention relates to soil cultivating apparatus and is especially applicable to apparatus known as subsoilers, in which a cultivating tool or tine penetrates and disturbs the sub-soil layer.

To avoid breakage of a tine in a subsoiler, the mounting of the tine on the main frame of the subsoiler is typically by two bolts, one of which is of smaller diameter than the other so that, on meeting an obstruction which might otherwise damage the tine, the smaller bolt shears, allowing the tine to pivot clear of the obstruction about the larger bolt. In rocky areas of the country, subsoilers have been found to be of limited use, because rocks in the subsoil layer cause repeated shearing of the bolts, requiring frequent stops during the subsoiling operation to instal new shearable bolts. This can lead operators to replace the shearable bolts with stronger bolts in the hope that the tine will then drag aside any, or at least most, obstructions. However, this practice frequently leads to breakage of the tines, and can even lead to damage to the tractor to which the subsoiler is connected.

An object of the invention is to provide soil cultivating apparatus in which the breakage of tines by sub-soil obstructions is avoided.

A further object of the invention is to provide apparatus in which the cultivating tool may readily be re-set to the operating position thereof after displacement from the soil by an obstruction.

BRIEF DESCRIPTION OF THE INVENTION

These and other objects of the invention are fulfilled, in accordance with the invention, by providing soil cultivating apparatus including a cultivating tool for entering into the soil, and control means responsive to the force exerted on the tool by an obstacle encountered by the tool as the apparatus is drawn across the soil to lift the tool out of the soil.

According to one preferred embodiment of the invention, the soil cultivating apparatus comprises:

(a) a main support member securable to a towing vehicle such as a tractor;

(b) at least one secondary member pivoted thereto at the front end thereof relative to the direction of travel of the device in use;

(c) a soil cultivating tool pivotally suspended from the or each secondary member;

(d) a control arm extending transversely to the or each tool and carrying a ground-engaging member at the front end thereof; and (e) a force sensitive release means holding the control arm or arms or each control arm against movement relative to the secondary member and to the main support member until a predetermined force tending to pivot the control arm relative to the secondary member is exceeded.

When the cultivating tool meets an obstruction in the soil, the force due to the resistance to movement of the obstruction is transmitted thereby to the release means, which when the predetermined force is exceeded, allows the control arm to pivot, thereby lifting the cultivating tool out of the soil.

The release means preferably comprises a spring or a hydraulic cylinder controlling a latch engaging the control arm, the cylinder being provided, for example with an unloading valve which releases all the hydraulic pressure from the cylinder when a predetermined pressure is exceeded. The unloading valve may be reset, after it has released the pressure, either manually or by an automatic device, such as an electric solenoid, operated in response to repositioning of the apparatus for continued cultivation.

The apparatus can be used in any type of soil, the release loading of the unloading valve being varied accordingly.

BRIEF DESCRIPTION OF THE DRAWINGS

Further features, details, and advantages of the invention will be apparent from the following description, with reference to the drawings, of a preferred embodiment of the soil cultivating apparatus of the invention. In the drawings.

DETAILED DESCRIPTION OF THE DRAWINGS

Figure 1:
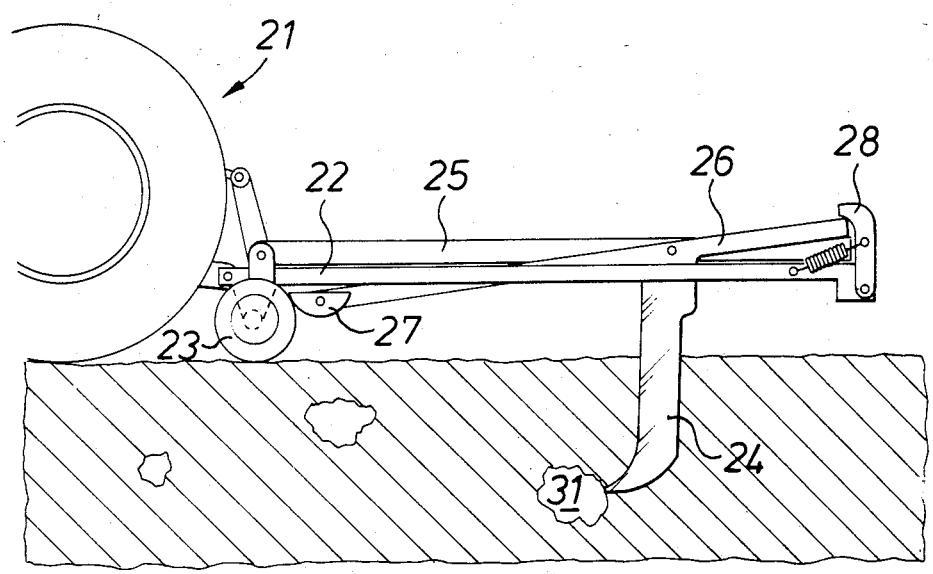
FIG. 1 is a schematic elevation of an apparatus in accordance with one embodiment of the invention, shown at the moment of contact between a tine and a buried obstruction.

In each Figure, the position of the towing vehicle, for example an agricultural tractor, relative to the apparatus, is indicated schematically by the rear wheel 21 thereof. The apparatus comprises a generally rectangular frame 22, coupled to the three point coupling typically provided on tractors, and having guide wheels 23 at the front end thereof. The tine 24 is pivotally mounted on a mounting beam 25 which is itself pivotally mounted on the front end of the frame 22. A control arm 26 extends generally perpendicular to the tine 24 on the upper end thereof, and carries a pivoting control pad 27 at its frontmost end. The rear end of the control arm 26, in the operative position of the apparatus, lies along the beam 25. A second such mounting beam 25 and associated tine 24 and control arm 26 are mounted on the frame 22 generally parallel to the first. The control arms 26 are held against pivoting relative to the beams 25 by a spring-biased latching member 28 pivoted to the rear end of the frame 22.

In use, the apparatus is drawn along by the tractor, and when the tine 24 comes into contact with a buried obstacle such as a rock 31, the resistance to movement produces an upward force in the rear end of the control arms 26. When a predetermined force is exceeded, this force being determined by the spring tension, which may be variable if desired, the latching member 28 moves rearwardly, thus releasing the arms 26 to pivot. The pivoting of the arms 26 has two effects. Firstly, the tines 24 pivot rearwardly, and secondly, the beams 25 are lifted and pivot relative to the frame 22, thus causing the tines 24 to lift.

Figure 2:
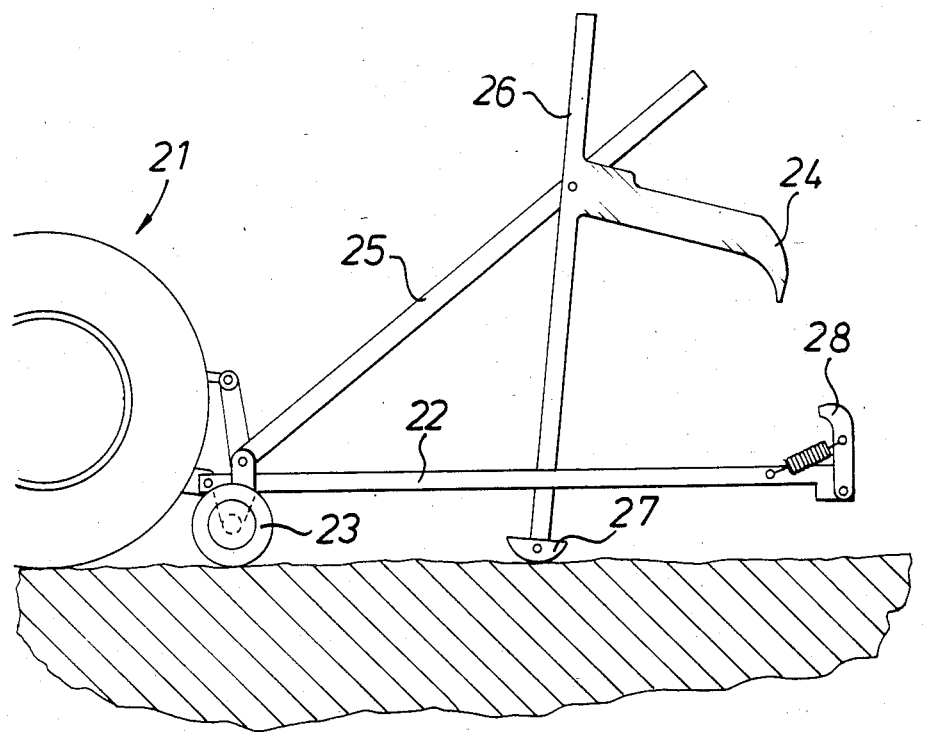
FIG. 2 is a corresponding view, the apparatus having advanced by a short distance.

As the control pads 27 come into contact with the ground, the control arms 26 then pivot about the pads 27. This accelerates the rearward and upward motion of the tines 24 so that they mo e rearwardly quicker than the forward motion of the frame, thus reducing and removing the contact force between tine 24 and rock 31, and avoiding the risk of damage. The tines are lifted into the frame 22 and clear of the soil, as shown in FIG. 2. To re-set the tines in position for further cultivation, the operator need only lift the whole frame vertically until the weight of the tines causes the arms and tines to reassume the working positions, and the latching members 28 re-engage the control arms 26.

Figure 3:
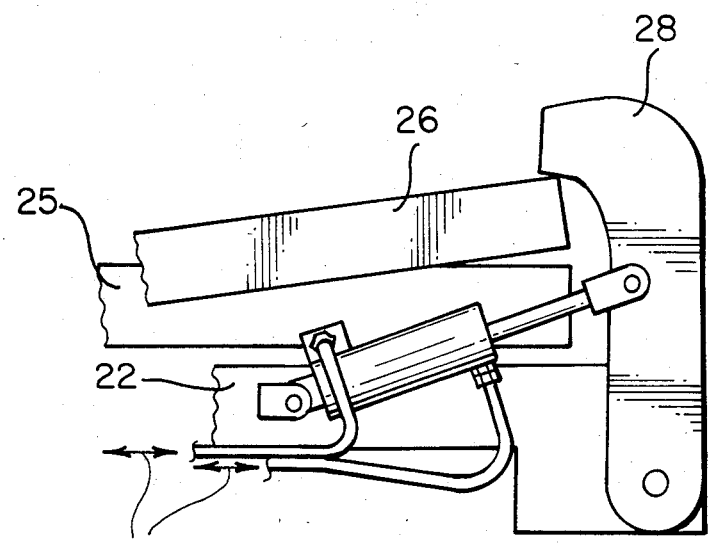
FIG. 3 is a fragmentary view of the right-hand portion of FIG. 1, but showing a modification, utilizing a hydraulic cylinder in place of the spring of FIG. 1.

FIG. 3 illustrates schematically an alternative embodiment of the release means for the latch, utilizing a hydraulic cylinder instead of a spring, as previously described.

I claim

1. Soil cultivating apparatus comprising:
   (a) a main support member securable to a towing vehicle and extending rearwardly therefrom;
   (b) an elongated secondary member pivoted to said main support member at the front ends of the main support member and the secondary member relative to the direction of travel of the apparatus in use so as to pivot in a vertical plane;
   (c) a soil cultivating tool pivotally suspended from a rearward part of said secondary member;
   (d) a rigid control arm extending from said tool and having a forward end carrying a ground-engaging member whereby upon pivotal movement of said tool upon encountering an obstacle the ground-engaging member will move downwardly to engage the ground and accelerate the pivoting of the tool rearwardly and upwardly out of the soil and pivot said secondary member upwardly; and
   (e) a force sensitive release means carried at least in part by said main support member and holding said control arm against movement relative to said secondary member and to said main support member until the force on said tool tending to pivot said control arm relative to said secondary member exceeds a predetermined value, and for releasing said control arm in response to said force exceeding a predetermined value.

2. Apparatus according to claim 1, wherein said release means comprises a latch engaging said control arm and a spring controlling release of said latch.

3. Apparatus according to claim 1, wherein said release means comprises a latch engaging said control arm and a hydraulic cylinder controlling release of said latch, said hydraulic cylinder being provided with an unloading valve which releases all the hydraulic pressure from said cylinder when a predetermined pressure is exceeded.

4. Apparatus according to claim 1, wherein said release means comprises a latch engaging said control arm and a hydraulic cylinder controlling release of said latch, said hydraulic cylinder being provided with manually adjustable pressure unloading means, said unloading means including valve means and adjustable biasing means, and said adjustable biasing means being adjustable to allow said valve means to open above a selected predetermined hydraulic pressure.

* * * * *